United States Patent Office 2,846,040
Patented Aug. 5, 1958

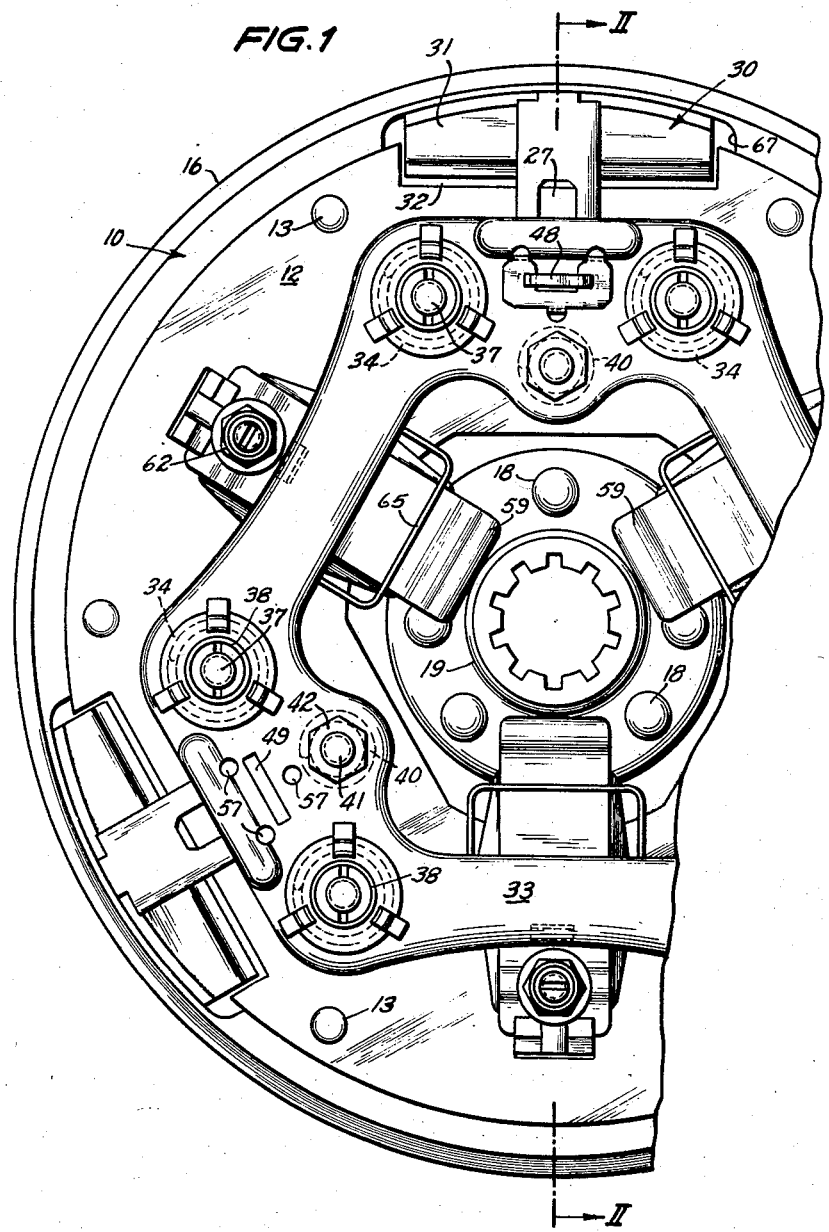

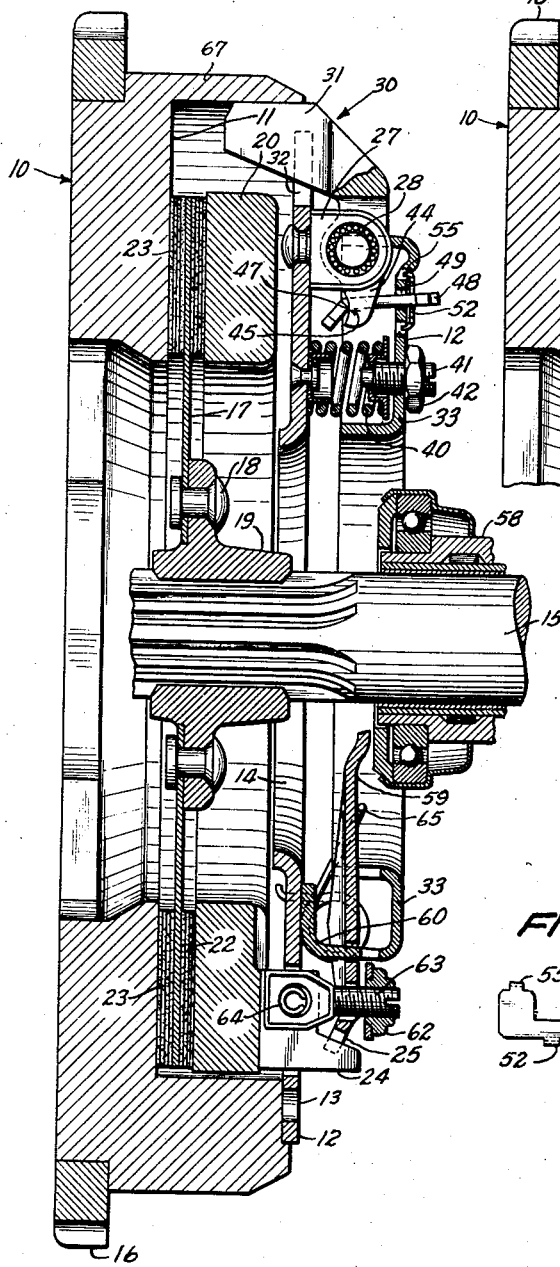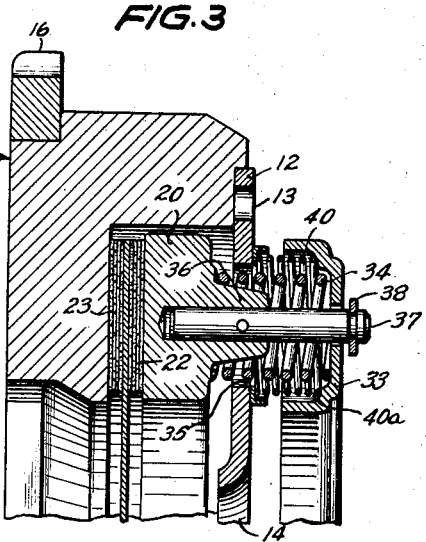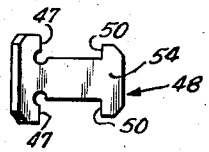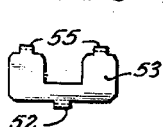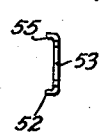

2,846,040

CENTRIFUGAL FRICTION CLUTCH

Richard Binder and Adolf Ludwig,
Schweinfurt am Main, Germany

Application November 21, 1955, Serial No. 548,202

Claims priority, application Germany November 24, 1954

8 Claims. (Cl. 192—105)

The present invention relates to a novel form centrifugal clutch construction, and more particularly to improvements in a centrifugal clutch which is engaged and disengaged automatically by means of centrifugal weights in dependence upon the speed of a motor with which the clutch is used. The clutch is also capable of being disengaged at will regardless of the speed of the motor.

The present application is a continuation-in-part of our copending application, Serial No. 304,088 filed August 13, 1952, for Friction Clutches, now Patent No. 2,748,913 issued on June 5, 1956.

Generally, the invention comprises a rotatable clutch housing which may conveniently take the form of a recessed engine flywheel provided with a cover plate. The clutch is provided with an axially displaceable annular pressure plate connected to the clutch housing for rotation therewith. The flywheel and the pressure plate are provided with confronting friction facings between which a friction disc is sandwiched. Opposite axial displacements of the pressure plate selectively frictionally connect the friction disc jointly to the flywheel and pressure plate or disconnect the friction disc therefrom. Centrifugal weights with radially inwardly extending lever arm projections are pivoted to the cover plate of the clutch housing, the cover plate extending over the recess in the flywheel.

Clutch engaging movement of the annular pressure plate is effected through a series of clutch engaging compression springs all of which are disposed within a generally annular axially movable spring housing. The spring housing is connected to the lever arm extensions of the centrifugal weights by means of a series of knife-edged link members. The knife-edged link members reduce friction and increase the sensitivity of the clutch to speed variations of the clutch housing. The inner end portions of the lever arm extensions of the weights are notched to cooperate with one set of knife edges of the link members. The spring housing is in the form of a metal stamping and hardened bearing plates are mounted on the spring housing for cooperation with the other set of knife edges of the link members.

The friction disc is connected to a shaft coaxial with the rotational axis of the clutch housing. The clutch may be disengaged at will by axial movement of a thrust collar mounted on the shaft. The thrust collar cooperates with clutch releasing levers connected to the pressure plate so that the pressure plate may be forced into clutch disengaging position against the force of the centrifugal weights exerted through the clutch engaging compression springs, regardless of the speed of the clutch housing.

A group of clutch releasing springs extending between the spring housing and the cover of the clutch housing yieldingly urge the spring housing into clutch releasing position. To engage the clutch, the knife-edged link members must overcome the force exerted by the clutch releasing springs, whereafter further centrifugal force is available to force the annular pressure plate into clutch engaging position through the clutch engaging springs.

Various objects, features and advantages of the invention will become apparent upon reading the following specification together with the accompanying drawing.

Referring to the drawing:

Figure 1 is a partial end elevational view of a centrifugal friction clutch in accordance with the present invention, one of the knife-edged link members and its associated hardened bearing plate being omitted to illustrate details of construction;

Figure 2 is a vertical section through the clutch taken along line II—II of Fig. 1;

Figure 3 is a fragmentary sectional view taken along a radial plane passing axially through the rotational axis of the clutch and the axis of one of the clutch engaging compression springs, Fig. 3 including a modification wherein one of the clutch releasing springs is shown coaxially arranged with respect to one of the clutch engaging springs;

Figure 4 is a view of one of the knife-edged link members looking radially outwardly from the rotational axis of the clutch;

Figure 5 is an edge view of the knife-edged link member of Fig. 4 looking in a direction normal to a plane passing through the rotational axis of the clutch;

Figure 6 shows one of the hardened bearing plates as seen in the end elevational view of the clutch illustrated in Fig. 1; and Figure 7 is an end view of the bearing plate shown in Fig. 6 looking in a direction normal to a plane passing through the rotational axis of the clutch.

Referring now more particularly to the drawings, in Figs. 1 and 2 there is shown a recessed flywheel 10 which is driven by an internal combustion engine or the like (not shown), the engine being located behind the flywheel 10 as viewed in Fig. 1 and to the left thereof as viewed in Figs. 2 and 3. The crankshaft of the engine is connected directly to the flywheel 10 in conventional manner. The recess 11 formed in the flywheel 10 is covered by a cover plate 12 which is secured to the right hand side of the flywheel 10 (as viewed in Figs. 2 and 3) by screws at 13. At its inner edge, the cover plate 12 is provided with a curved lip 14. The recessed flywheel 10 and its cover plate 12 thus form a rotatable clutch housing 10—12.

A suitably journaled shaft 15, to be driven by the engine flywheel 10 through clutch mechanism later to be described, is disposed in axial alignment with the rotational axis of the clutch housing 10—12. The flywheel 10 is also provided with the usual externally toothed ring gear 16 for engagement by the engine starter (not shown). An annular friction disc 17 is secured by means of bolts 18 to a hub 19 which is axially slidably splined to the driven shaft 15. An annular pressure plate 20 is provided with a friction facing 22. Another friction facing 23 is secured to the flywheel 10 confronting the friction facing 22. The friction disc 17 is sandwiched between the friction facings 22 and 23. The pressure plate 20 is provided with axially extending projections 24 which pass slidably through apertures 25 formed in the cover plate 12. The pressure plate 20 is thus axially displaceable within the rotatable clutch housing 10—12 and is connected to the flywheel 10 for rotation therewith by the axially extending projections 24 which are guided in the apertures 25 in cover plate 12.

Fixedly mounted on the cover plate 12 are three bearing brackets 27 supporting needle bearings 28. Centrifugal weights designated generally as 30 are pivotally mounted each on one of the bearing brackets 27 by a respective needle bearing 28. Each weight 30 comprises an enlarged head 31 constituting the clutch actuating mass. The enlarged heads 31 are guided laterally by rectangular peripheral recesses 32 formed in the cover plate 12 so that the forces of acceleration or deceleration will be transmitted by the centrifugal weights 30 directly to the cover plate 12 rather than by through the needle bearings.

A generally hexagonal annular spring housing 33 is spaced from the cover plate 12 and is axially movable with respect thereto. The spring housing 33 is symmetrical and is concentric with the common rotational axis of the clutch housing 10—12 and the shaft 15. A series of helical clutch engaging compression springs 34 are provided, one pair of clutch engaging springs 34 being disposed symmetrically with respect to each weight 30. The clutch engaging springs 34 pass through apertures 35 formed in the cover plate 12 to engage the pressure plate 20.

The pressure plate 20 is provided with bosses 36 each of which receives and guides one end of one of the clutch engaging springs 34. The other end of each clutch engaging spring 34 presses against the inner side of the spring housing 33. An axially extending guide rod 37 (Fig. 3) is pinned within the boss 36 and extends to the outer side of the spring housing 33. At its outer end the guide rod is provided with a stop washer 38 for limiting movement of the spring housing 33 away from the cover plate 12. Movement of the spring housing 33 toward the cover plate 12 is guided by the guide rods 37 and is yieldingly opposed by helical clutch disengaging compression springs 40.

The pressures of the clutch disengaging compression springs 40 may be individually adjusted by means of set screws 41 provided with lock nuts 42. Such adjustment will vary the predetermined speed at which the clutch engages and disengages.

In the modified form of the invention shown in Fig. 3, the clutch disengaging springs 40a may be arranged coaxially surrounding the clutch engaging springs 34 within the spring housing 33. As shown in Fig. 3, the relatively weak clutch disengaging springs 40a may supplement the adjustable clutch disengaging springs 40 illustrated in Figs. 1 and 2.

The centrifugal weights 30 comprise radially inwardly extending lever arm extensions 44. The lever arm extensions 44 have notches 45 formed therein for receiving the knife edges 47 at one end of a knife-edged link member 48 (Figs. 2, 4 and 5). The link member 48 passes freely through a slot 49 (Fig. 1, lower left), formed in the spring housing 33. Each link member 48 is provided with outer knife edges 50 which engage a hardened bearing plate 52 mounted on the outside of the spring housing 33. The bearing plate 52 is provided with legs 53 which partially cover the slot 49 and prevent the outer head portion 54 of the link member 48 from passing through the slot 49. The slot 49 is long enough, however, to permit the head portion 54 of link member 48 to be passed therethrough during assembly of the clutch. After assembly, the legs 53 of bearing plate 52 provide pivotal support for the outer knife edges 50 of the link member 48. The bearing plate 52 is provided with lugs 55 which are received in holes 57 formed in the spring housing 33. The lugs 55 secure the bearing plate 52 in position as shown in Figs. 1 and 2. The link member 48 and the clutch disengaging springs 40 prevent outward movement of the bearing plate 52 away from the spring housing 33 and hold the lugs 55 positioned in the holes 57.

Clutch releasing mechanism is provided which may be used to disengage the clutch at any time regardless of the speed of the clutch housing 10—12. This releasing mechanism comprises a slidable bearing 58 mounted on the shaft 15. When moved toward the left, as viewed in Fig. 2, the bearing 58 engages the free ends of radially inwardly extending clutch disengaging levers 59. Each clutch disengaging lever 59 is mounted for pivotal movement on an L-shaped supporting bracket 60, each bracket 60 being fixed to the cover plate 12. Each clutch disengaging lever 59 is arranged at its outer end to press against a nut 62 threaded on a bolt 63. One end of each bolt 63 is connected to one of the pressure plate guiding projections 24 by a pivot pin 64. Each clutch disengaging lever 59 is biased in the clutch disengaging direction by a hairpin spring 65 to take up play. Thus, when the slidable bearing 58 is moved toward the left, as viewed in Fig. 2, the clutch disengaging levers 59 pull the nuts 62 to the right and the pressure plate 20 is forced to the right against the pressure, if any, of the clutch engaging springs 34. This movement of pressure plate 20 disconnects the friction disc 17 from the friction facings 22 and 23. When the slidable bearing 58 is moved toward the right, the clutch will be engaged or disengaged in dependence upon the rotational speed of the clutch housing 10—12.

As shown in Fig. 2, the heads 31 of the weights 30 are pressed against the inner surface of the wall 10 of the flywheel 10 in outwardly extending recesses 67 formed in the wall of the flywheel 10 to provide space for the heads 31 of the weights 30. In this position, as shown in Fig. 2, any increase in speed of the flywheel 10 will not have any effect upon the positions of the weights 30 because their heads 31 bear against the rim of the flywheel 10. Under these conditions, the clutch engaging springs press the pressure plate 20 to engage the friction disc 17 with maximum pressure.

If the speed of the flywheel 10 is decreased, sufficiently, the clutch disengaging springs 40 will press the spring housing 33 toward the right and rotate the weights 30 in a counterclockwise direction as viewed in Fig. 2, thus reducing the pressure of engagement on the pressure plate 20. In response to a sufficient reduction in rotational speed, the heads 31 of the weights 30 will move inwardly toward the center of the flywheel and will rest against the outer edge of the pressure plate 20, with the clutch completely disengaged.

The thickness of the novel clutches as viewed in Figs. 2 and 3 is minimal and operation of the weights in effecting engagement is substantially frictionless. The springs all bear evenly on the spring housing and no change in force distribution is incidentally encountered, this being avoided as a result of the secure positioning of the guide members 37 and the support members 36.

Various changes and modifications may be made without departing from the spirit and scope of the invention as defined in the appended claims.

What we claim is:

1. A centrifugal clutch comprising a rotatable clutch housing; a shaft to be selectively connected to and disconnected from said clutch housing by engagement and disengagement of said clutch, said shaft being in axial alignment with the rotational axis of said clutch housing; an axially displaceable annular clutch control member concentric with said shaft and connected to said housing for rotation therewith; confronting flat annular friction facings carried by said housing and said control member, respectively; a friction disc sandwiched between said friction facings and connected to said shaft, said disc being selectively frictionally connected jointly to said clutch housing and control member or disconnected therefrom by opposite axial displacements of said annular control member; an elongated endless symmetrical spring housing concentrically surrounding said shaft, said spring housing being axially spaced from said control member; a plurality of symmetrically arranged clutch engaging springs disposed within said spring housing and resiliently connecting said spring housing to said control member; a plurality of clutch releasing springs symmetrically disposed in said spring housing and extending between said spring housing and said clutch housing, said releasing springs resiliently urging movement of said spring housing for causing axial displacement of said control member to disconnect said disc; a plurality of symmetrically arranged centrifugal weights pivoted to said clutch housing, said weights having lever arm extensions which are displaced substantially axially in response to pivotal movements of said weights; and a plurality of knife-edged link members each connecting one of said lever arm extensions to said spring housing for causing axial displacement in a clutch engaging direction of said control member in response to increases in the rotational speed of said clutch housing to effect engagement above, and permit disengagement below a predetermined speed.

2. A clutch according to claim 1, in which said spring housing has a plurality of apertures formed therein, one of said link members extending through each of said apertures, said spring housing further comprising a plurality of hardened bearing plates each partially covering one of said apertures and each providing pivotal support for the knife edge portion of one of said link members.

3. A clutch construction comprising a first rotatable clutch member and a second rotatable clutch member to be selectively frictionally coupled together or disconnected from each other; interengageable friction means carried by said first and second clutch members for coupling said members together; an axially displaceable pressure plate member carried by said first member for pressing said friction means into interengagement and disengaging the same by opposite displacements thereof; first spring means yieldingly urging said pressure plate member in the disengaging direction; centrifugally displaceable weight means carried by one of said clutch members, said weight means being adapted to exert a force proportional to the angular velocity of the clutch member by which it is carried; an axially displaceable spring housing carried by the one of said clutch members which carries said weight means, said first spring means being disposed in said spring housing and pressing thereon; second spring means disposed in said spring housing and connecting said spring housing to said pressure plate member for resiliently urging said pressure plate member in the friction means interengaging direction of displacement thereof; and link means provided with knife-edged bearing surfaces connecting said weight means to said spring housing for causing interengagement of said friction means by displacement of said spring housing when the rotational speed of said weight means exceeds a predetermined speed, said first spring means causing displacement of said pressure plate means for disengaging said friction means when the rotational speed of said weight means is reduced below said predetermined speed.

4. A clutch construction according to claim 3, further comprising clutch disengaging means connected to said pressure plate means for displacement of said pressure plate means against the action of said second spring means notwithstanding the force exerted thereon by said weight means.

5. A clutch construction according to claim 4, further comprising stop means for limiting the displacement of said weight means, whereby the pressure exerted on said pressure plate means by said second spring means and which is to be overcome by said clutch disengaging means is limited to a predetermined maximum magnitude.

6. A centrifugal clutch, comprising in combination: a flywheel having a cylindrical recess formed therein coaxially therewith, said recess being open at one end and closed at the other; a cover plate secured to said flywheel and extending over the open end of said recess; a rotatable shaft coaxially aligned with said flywheel; an annular axially displaceable pressure plate member concentric with said shaft and disposed intermediate the closed end of said recess and said cover plate; a friction disc connected to said shaft and extending between the closed end of said recess and said pressure plate member guide extensions carried by said pressure plate member and extending slidably through said cover plate for constraining said pressure plate member to rotate with said flywheel; friction linings carried by said flywheel at said closed end of said recess and by said pressure plate member, said friction linings being disposed on opposite sides of said friction disc for simultaneous engagement therewith; a plurality of symmetrically arranged bearing brackets mounted on said cover plate exteriorly of said recess; an anti-friction bearing carried by each bearing bracket; a plurality of symmetrically arranged centrifugal weight members each pivoted in one of said anti-friction bearings, each weight member comprising an enlarged head portion slidably extending through said cover plate to be guided thereby, and a lever arm extension, said head portion extending into said recess and being disposed between the lateral wall of said recess and said anti-friction bearing, the guiding action of said cover plate serving to transmit stresses accompanying acceleration and deceleration of said flywheel directly from said head portion to said cover plate without stressing said antifriction bearing, said lever arm extension projecting radially inwardly beyond said anti-friction bearing, said lever arm extension having a notch formed therein facing said cover plate; a symmetrical and generally annular spring housing concentric with said flywheel, said spring housing being disposed exteriorly of said recess and beyond said lever arm extensions; guide means supporting said spring housing for simultaneous axial displacement with respect to said flywheel and for rotation therewith; clutch engaging spring means extending through said cover plate and connecting said spring housing to said pressure plate member; clutch disengaging spring means interposed between said cover plate and said spring housing, said clutch disengaging spring means yieldingly urging said spring housing away from said cover plate, said clutch engaging spring means and said clutch disengaging spring means both being at least partially disposed within said spring housing; and a plurality of knife-edged link members each having a knife edge seated in one of the notches of one of said lever arm extensions and another knife edge spaced from said first-named knife edge and connected to said spring housing for displacement of said spring housing toward said cover plate in response to generally radial outward movement of said head portion of said weight member.

7. A clutch according to claim 6, in which said spring housing has a plurality of slots formed therein, one of said link members extending through each one of said slots, each slot being of size sufficient to permit passage of said link member therethrough during assembly of said clutch; said clutch further comprising a plurality of hardened bearing plates each carried by said spring housing and each partially covering one of said slots, said last-named knife edges engaging said bearing plates.

8. A clutch according to claim 7, in which each link member has a T-shaped head portion, said last-named knife edges being formed on the under side of the crosspiece portion of said T, said head portion being insertable through said slot, and wherein each bearing plate is generally U-shaped and extends around the upright portion of said T with said last-named knife edges bearing against the legs of said U.

References Cited in the file of this patent

UNITED STATES PATENTS

| | | |
|---|---|---|
| 2,176,224 | Nutt | Oct. 17, 1939 |
| 2,406,049 | Thelander | Aug. 20, 1946 |
| 2,672,226 | Zeidler | Mar. 16, 1954 |
| 2,748,913 | Binder et al. | June 5, 1956 |

FOREIGN PATENTS

| | | |
|---|---|---|
| 413,372 | Italy | Apr. 15, 1946 |